US008335624B2

(12) United States Patent
Suzuki et al.

(10) Patent No.: US 8,335,624 B2
(45) Date of Patent: Dec. 18, 2012

(54) CLUTCH CONNECTION CONTROL APPARATUS AND VEHICLE INCLUDING THE SAME

(75) Inventors: Takahiro Suzuki, Shizuoka (JP); Kenji Fukushima, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1058 days.

(21) Appl. No.: 12/092,758

(22) PCT Filed: Oct. 30, 2006

(86) PCT No.: PCT/JP2006/321684
§ 371 (c)(1),
(2), (4) Date: May 21, 2008

(87) PCT Pub. No.: WO2007/055123
PCT Pub. Date: May 18, 2007

(65) Prior Publication Data
US 2009/0292432 A1 Nov. 26, 2009

(30) Foreign Application Priority Data
Nov. 8, 2005 (JP) .................................. 2005-323079

(51) Int. Cl.
G06F 7/00 (2006.01)
(52) U.S. Cl. ........................................... 701/68; 701/67
(58) Field of Classification Search ................ 701/1, 58, 701/67, 68; 192/3.51, 3.55; 477/70, 77, 477/79, 82
See application file for complete search history.

(56) References Cited

U.S. PATENT DOCUMENTS

| 7,044,281 B2 | 5/2006 | Kosugi et al. |
| 2004/0188218 A1* | 9/2004 | Berger et al. .................. 192/90 |
| 2005/0064987 A1* | 3/2005 | Budal et al. ..................... 477/3 |
| 2005/0167232 A1* | 8/2005 | Kosugi et al. ............... 192/85 R |
| 2005/0211524 A1* | 9/2005 | DeVore et al. ............... 192/3.63 |

FOREIGN PATENT DOCUMENTS

| CN | 1349058 A | 5/2002 |
| JP | 1-120438 A | 5/1989 |
| JP | 2004-278633 A | 10/2004 |
| WO | 98/46445 A1 | 10/1998 |

OTHER PUBLICATIONS

Official communication issued in the International Application No. PCT/JP2006/321684, mailed on Nov. 28, 2006.
Official Communication issued in corresponding Chinese Patent Application No. 200680041508.X, mailed on Sep. 8, 2010.
Official Communication issued in corresponding European Patent Application No. 06822613.3, mailed on Oct. 5, 2010.

* cited by examiner

*Primary Examiner* — John Q Nguyen
*Assistant Examiner* — Jordan S Fei
(74) *Attorney, Agent, or Firm* — Keating & Bennett, LLP

(57) ABSTRACT

A pressure sensor detects the change in pressure within a cylinder in a clutch master cylinder in a case where a clutch shifts from a connected state to a disconnected state. The pressure within the cylinder is detected at a time point where a rate of the pressure increase is changed. The position of a rod in this case or the rotation angle of a motor in an actuator is detected as a touch point preparation position. The touch point preparation position is a stage preceding power generated by an engine being transmitted to the clutch. The actuator moves the rod at high speed until the position of the rod reaches the position corresponding to the touch point preparation position.

8 Claims, 13 Drawing Sheets

F I G. 6
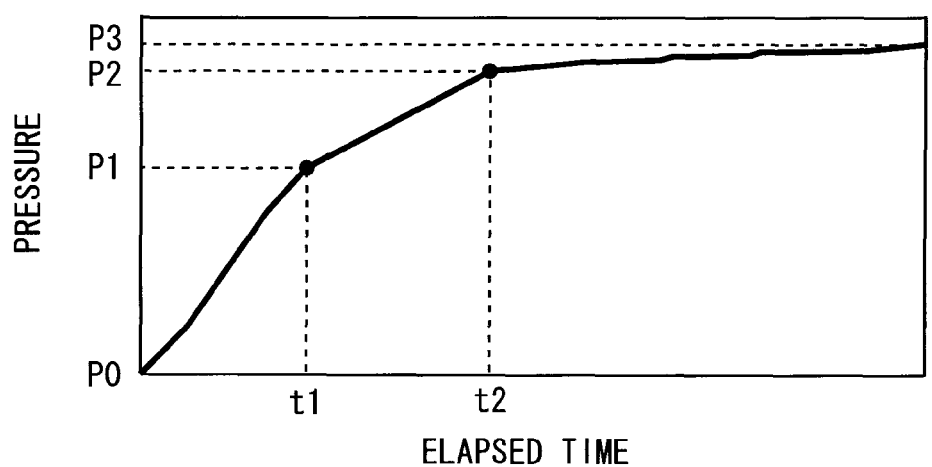

CLUTCH CONNECTION CONTROL APPARATUS AND VEHICLE INCLUDING THE SAME

BACKGROUND OF THE INVENTION

1. Field of the Invention

The present invention relates to a clutch connection control apparatus and a vehicle including the same.

2. Description of the Related Art

Conventionally, there is a method of changing a clutch in a vehicle from a disconnected state to a connected state by a clutch connection control apparatus when a vehicle starts moving and when gear shifts are performed (see, for example, JP 2003-329064 A).

In the clutch connection control apparatus disclosed in JP 2003-329064 A, described above, the clutch is shifted to a connected state at a first connection and engagement speed until a certain time (hereinafter referred to as time t), and is shifted to the connected state at a second connection and engagement speed lower than the first connection and engagement speed at the time t.

When a magnetostrictive sensor that detects a power transmitted state of the clutch detects the power transmitted state of the clutch, the clutch is connected at a third connection and engagement speed (a connection and engagement speed in a half-clutched state), which is lower than the second connection and engagement speed. Thereafter, after a predetermined time period has elapsed since the clutch has not slipped, the clutch is connected at a fourth connection and engagement speed higher than the third connection and engagement speed. This causes the clutch to be completely connected.

By thus gradually controlling a non-connected state and the connected state of the clutch, a rider can quickly operate a gearshift without being rapidly and strongly jolted.

As described in the foregoing, the time when power from an engine starts to be transmitted to a clutch is generally referred to as a touch point (TP). When the clutch is brought into a connected state at a high clutch connection and engagement speed at this touch point, the rider may be strongly jolted, and a motorcycle may run out or the engine may stall.

In order to prevent this, in the conventional clutch connection control apparatus, a control process is carried out such that the clutch is shifted to the connected state at the second connection and engagement speed lower than the first connection and engagement speed at the time t, and the magnetostrictive sensor detects the power transmitted state of the clutch.

However, the touch point differs from motorcycle to motorcycle due to wear (changes in coefficients of friction) of various types of plates defining the clutch, for example.

As a result, even when the time t is accurately measured as in the conventional clutch connection control apparatus, the power may be transmitted to the clutch before this time t. That is, the clutch is brought into the connected state at the first connection and engagement speed higher than the second connection and engagement speed. Thus, the rider may be strongly jolted, and the motorcycle may run out or the engine may stall, as described above.

SUMMARY OF THE INVENTION

In order to overcome the problems described above, preferred embodiments of the present invention provide a clutch connection control apparatus capable of bringing a clutch into a connected state and a disconnected state smoothly and quickly, and a vehicle including the same.

According to a preferred embodiment of the present invention, a clutch connection control apparatus that transmits and disconnects a torque between a first shaft and a second shaft preferably includes a clutch that includes a driving member movable in a first direction and in a second direction opposite to the first direction and biased in the first direction, and can shift to a first state where the torque is transmitted between the first shaft and the second shaft by the movement in the first direction of the driving member, and can shift to a second state where the torque is not transmitted between the first shaft and the second shaft by the movement in the second direction of the driving member; a driving device that moves the driving member in the clutch in the first direction and the second direction; a detector that detects a load applied to the driving device by the driving member in a process of shifting from the second state to the first state or a process of shifting from the first state to the second state in a predetermined preparation operation; a calculator that calculates a rate of change in the load detected by the detector; a determination unit that determines the value of the load applied to the driving device by the driving member at a time point preceding a time point where the clutch shifts to the first state or the second state or the value of information having a predetermined relationship with the position of the driving member at the preceding time point as a pre-operation point on the basis of the rate of change in the load calculated by the calculator; a storage device that stores the pre-operation point determined by the determination unit; and a control device that controls the driving device such that the movement speed of the driving member is changed when the value of the load applied to the driving device by the driving member in the process of shifting from the second state to the first state or the value of the information having the predetermined relationship with the position of the driving member is equal to the pre-operation point stored in the storage device in a normal clutch operation.

In the clutch connection control apparatus, the driving device moves the driving member in the clutch in the first direction and the second direction. Furthermore, the driving member in the clutch is preferably biased in the first direction. The clutch can shift to the first state where the torque is transmitted between the first shaft and the second shaft by the movement in the first direction of the driving member and the second state where the torque is not transmitted between the first shaft and the second shaft by the movement in the second direction of the driving member.

In the predetermined preparation operation, the detector preferably detects the load applied to the driving device by the driving member in the process of shifting from the second state to the first state or the process of shifting from the first state to the second state, and the calculator calculates the rate of change in the load detected by the detector.

The determination unit preferably determines the value of the load applied to the driving device by the driving member at the time point preceding the time point where the clutch shifts to the first state or the second state or the value of the information having the predetermined relationship with the position of the driving member at the preceding time point as the pre-operation point on the basis of the rate of change in the load calculated by the calculator. Furthermore, the storage device stores the pre-operation point determined by the determination unit.

The control device preferably controls the driving device such that the movement speed of the driving member is changed when the value of the load applied to the driving device by the driving member in the process of the shift from the second state to the first state or the value of the information having the predetermined relationship with the position of the driving member is equal to the pre-operation point stored in the storage device.

In such a configuration, a touch point that differs from clutch to clutch and is difficult to detect due to wear of the clutch, for example, is not used. Note that the touch point means a stage (timing or a mechanical position) in which the torque in the first shaft starts to be transmitted to the second shaft.

In the clutch connection control apparatus according to the various preferred embodiments of the present invention, it is possible to bring the clutch into a connected state (first state) and a disconnected state (second state) smoothly and quickly by detecting a pre-operation point that is a stage preceding the touch point at which the torque in the first shaft starts to be transmitted to the second shaft and changing the movement speed of the driving member at the detected pre-operation point.

The determination unit may determine, when the rate of change in the load detected by the detector is reduced to a first value, a second value, and a third value, in this order, in the process of shifting from the first state to the second state, the value of the load applied to the driving device by the driving member at a change point between the second value and the third value or the value of the information having the predetermined relationship with the position of the driving member at the preceding time point as the pre-operation point. The control device may control the driving device such that the movement speed of the driving member is reduced when the value of the load applied to the driving device by the driving member in the process of shifting from the second state to the first state or the value of the information having the predetermined relationship with the position of the driving member is equal to the pre-operation point stored in the storage device in the normal clutch operation.

In this case, the determination unit preferably determines, when the rate of change in the load detected by the detector is reduced to the first value, the second value, and the third value, in this order, in the process of shifting from the first state to the second state, the value of the load applied to the driving device by the driving member at the change point between the second value and the third value or the value of the information having the predetermined relationship with the position of the driving member at the preceding time point as the pre-operation point.

In the normal clutch operation, the control device preferably controls the driving device such that the movement speed of the driving member is reduced when the value of the load applied to the driving device by the driving member or the value of the information having the predetermined relationship with the position of the driving member is equal to the pre-operation point stored in the storage device in the process of shifting from the second state to the first state. This allows the clutch to be brought into the connected state and the disconnected state smoothly and quickly.

The clutch connection control apparatus may further include a first rotational speed detector that detects the rotational speed of the first shaft, and a second rotational speed detector that detects the rotational speed of the second shaft, in which the first shaft may transmit the torque to the second shaft at a predetermined ratio of the rotational speeds. The control device may control, in the normal clutch operation, the driving device such that the driving member moves at a first speed until the value of the load applied to the driving device by the driving member in the process of shifting from the second state to the first state or the value of the information having the predetermined relationship with the position of the driving member reaches the pre-operation point, moves at a second speed lower than the first speed from the pre-operation point until the second rotational speed detector detects the rotation of the second shaft, then moves at a third speed lower than the second speed, and moves at a fourth speed higher than the third speed when the product of the rotational speed of the first shaft, which is detected by the first rotational speed detector, and the ratio substantially coincides with the rotational speed of the second shaft, which is detected by the second rotational speed detector.

In this case, the first rotational speed detector detects the rotational speed of the first shaft, and the second rotational speed detector detects the rotational speed of the second shaft. The first shaft transmits the torque to the second shaft at a predetermined ratio of the rotational speeds.

In the normal clutch operation, the control device preferably first moves the driving member at the first speed until the value of the load applied to the driving device or the value of the information having the predetermined relationship with the position of the driving member reaches the pre-operation point in the process of shifting from the second state to the first state, to inhibit the engine from applying the torque to the first shaft from turning freely.

Then, the control device preferably moves the driving member at the second speed lower than the first speed from the pre-operation point until the second rotational speed detector detects the rotation of the second shaft, to inhibit the clutch from immediately shifting from the disconnected state to the connected state when the speed at which the driving member is moved is high. This prevents a vehicle using the clutch connection control apparatus from running out.

Then, the control device moves the driving member at the third speed lower than the second speed, and then moves the driving member at the fourth speed higher than the third speed when the product of the rotational speed of the first shaft and the predetermined ratio substantially coincides with the rotational speed of the second shaft, which can prevent the behavior of the vehicle from changing by slipping of the clutch occurring when a rider quickly opens a throttle and prevent the rider from having an uncomfortable feeling before and after the product of the rotational speed of the first shaft and the ratio substantially coincides with the rotational speed of the second shaft.

The driving device may include an actuator that generates a driving force and a hydraulic system that converts the driving force generated by the actuator into hydraulic pressure, and the detector may include a pressure detector that detects the hydraulic pressure obtained by the hydraulic system as the load.

In this case, the actuator generates the driving force in the driving device, and the hydraulic system converts the driving force generated by the actuator into the hydraulic pressure. The pressure detector in the detector detects the hydraulic pressure obtained by the hydraulic system as the load. This makes it easy to detect the load which corresponds to the hydraulic pressure. Therefore, shifting between the first state and the second state of the clutch is easily controlled.

The clutch may include first and second friction plates that are arranged movably and alternately in the first direction and the second direction, a first elastic member that biases the first friction plate in the direction in which the first friction plate presses the second friction plate, a second elastic member that biases the second friction plate in the direction in which the second friction plate presses the first friction plate, wherein the elastic coefficient of the first elastic member may be less than the elastic coefficient of the second elastic member, and the first elastic member may bias the driving member in the first direction.

In this case, the first and second friction plates are arranged movably and alternately in the first direction and the second direction. The first elastic member biases the first friction plate in the direction in which the first friction plate presses the second friction plate, and the second elastic member biases the second friction plate in the direction in which the second friction plate presses the first friction plate.

Furthermore, the elastic coefficient of the first elastic member is preferably less than the elastic coefficient of the second elastic member. The first elastic member biases the driving member in the first direction. Thus, the clutch according a preferred embodiment of the present invention is configured as a friction clutch, and the clutch can be brought into the connected state and the disconnected state smoothly and quickly.

The hydraulic system may include a cylinder and a moving member provided in the cylinder so as to be movable in synchronization with the movement of the driving member, and the determination unit may determine the position of the moving member as the value of the information having the predetermined relationship with the driving member.

In this case, the moving member is provided in the cylinder so as to be movable in synchronization with the movement of the driving member. The determination unit determines the position of the moving member as the value of the information having the predetermined relationship with the driving member. This allows the pre-operation point to be easily determined.

The actuator may include a motor, and the determination unit may determine the rotation angle of the motor as the value of the information having the predetermined relationship with the driving member.

In this case, the determination unit determines the rotation angle of the motor in the actuator as the value of the information having the predetermined relationship with the driving member. This allows the pre-operation point to be easily determined.

According to another preferred embodiment of the present invention, a vehicle preferably includes an engine that generates power, a clutch connection control apparatus, a driving wheel, a first transmission mechanism that transmits as a torque the power generated by the engine to the first shaft in the clutch connection control apparatus, and a second transmission mechanism that transmits the torque in the second shaft in the clutch connection control apparatus to the driving wheel. The clutch connection control apparatus preferably includes a clutch that includes a driving member movable in first direction and the second direction and biased in the first direction and can shift to a first state where the torque is transmitted between the first shaft and the second shaft by the movement in the first direction of the driving member and can shift to a second state where the torque is not transmitted between the first shaft and the second shaft by the movement in the second direction of the driving member. The vehicle also preferably includes a driving device that moves the driving member in the clutch in the first direction and the second direction, a detector that detects a load applied to the driving device by the driving member in a process of shifting from the second state to the first state or a process of shifting from the first state to the second state in a predetermined preparation operation, a calculator that calculates a rate of change in the load detected by the detector, a determination unit that determines the value of a load applied to the driving device by the driving member at a time point preceding a time point where the clutch shifts to the first state or the second state or the value of information having a predetermined relationship with the position of the driving member at the preceding time point as a pre-operation point on the basis of the rate of change in the load calculated by the calculator, a storage device that stores the pre-operation point determined by the determination unit, and a control device that controls the driving device such that the movement speed of the driving member is changed when the value of the load applied to the driving device by the driving member in the process of shifting from the second state to the first state or the value of the information having the predetermined relationship with the position of the driving member is equal to the pre-operation point stored in the storage device in a normal clutch operation.

The first transmission mechanism transmits the power generated by the engine to the first shaft in the clutch connection control apparatus as the torque. Furthermore, the second transmission mechanism transmits the torque in the second shaft in the clutch connection control apparatus to the driving wheel.

In the clutch connection control apparatus, the driving device preferably moves the driving member in the clutch in the first direction and the second direction. Furthermore, the driving member in the clutch is biased in the first direction. The clutch can shift to the first state where the torque is transmitted between the first shaft and the second shaft by the movement in the first direction of the driving member and the second state where the torque is not transmitted between the first shaft and the second shaft by the movement in the second direction of the driving member.

In the predetermined preparation operation, the detector preferably detects the load applied to the driving device by the driving member in the process of shifting from the second state to the first state or the process of shifting from the first state to the second state, and the calculator calculates the rate of change in the load detected by the detector.

Furthermore, the determination unit preferably determines the value of the load applied to the driving device by the driving member at the time point preceding the time point where the clutch shifts to the first state or the second state or the value of the information having the predetermined relationship with the position of the driving member at the preceding time point as the pre-operation point on the basis of the rate of change in the load calculated by the calculator. Furthermore, the storage device stores the pre-operation point determined by the determination unit.

The control device preferably controls the driving device such that the movement speed of the driving member is changed when the value of the load applied to the driving device by the driving member in the process of the shift from the second state to the first state or the value of the information having the predetermined relationship with the position of the driving member is equal to the pre-operation point stored in the storage device.

In such a configuration, a touch point that differs from clutch to clutch and is difficult to detect due to wear of the clutch, for example, is not used.

In such a way, it is possible to bring the clutch into the connected state (first state) and the disconnected state (second state) smoothly and quickly by detecting the pre-operation point that is a stage preceding the touch point at which the torque in the first shaft starts to be transmitted to the second shaft and changing the movement speed of the driving member at the detected pre-operation point.

The use of the above-mentioned clutch connection control apparatus allows the clutch to be brought into the connected state and the disconnected state smoothly and quickly. Therefore, it is possible to carry out start control or stop control of the vehicle smoothly and quickly. This prevents the rider from being strongly jolted, and can prevent the vehicle from running out or prevent the engine from stalling.

In the clutch connection control apparatus according to the various preferred embodiments of the present invention, the clutch can be brought into the connected state and the disconnected state smoothly and quickly. The use of the clutch connection control apparatus for the vehicle makes it possible to carry out start control or stop control of the vehicle smoothly and quickly. This prevents the rider from being strongly jolted, and can prevent the vehicle from running out or prevent the engine from stalling.

Other features, elements, characteristics, and advantages of the present invention will become more apparent from the following description of preferred embodiments of the present invention with reference to the attached drawings.

BRIEF DESCRIPTION OF THE DRAWINGS

FIG. 6 is an explanatory view showing a method of detecting a touch point preparation position.

DETAILED DESCRIPTION OF PREFERRED EMBODIMENTS

Preferred embodiments of the present invention will be described in detail with reference to the drawings. The preferred embodiments below describe a clutch connection control apparatus. In the various preferred embodiments, description is made of a clutch connection control apparatus used for a motorcycle serving as an example of a vehicle.

Overall Configuration

Figure 1:
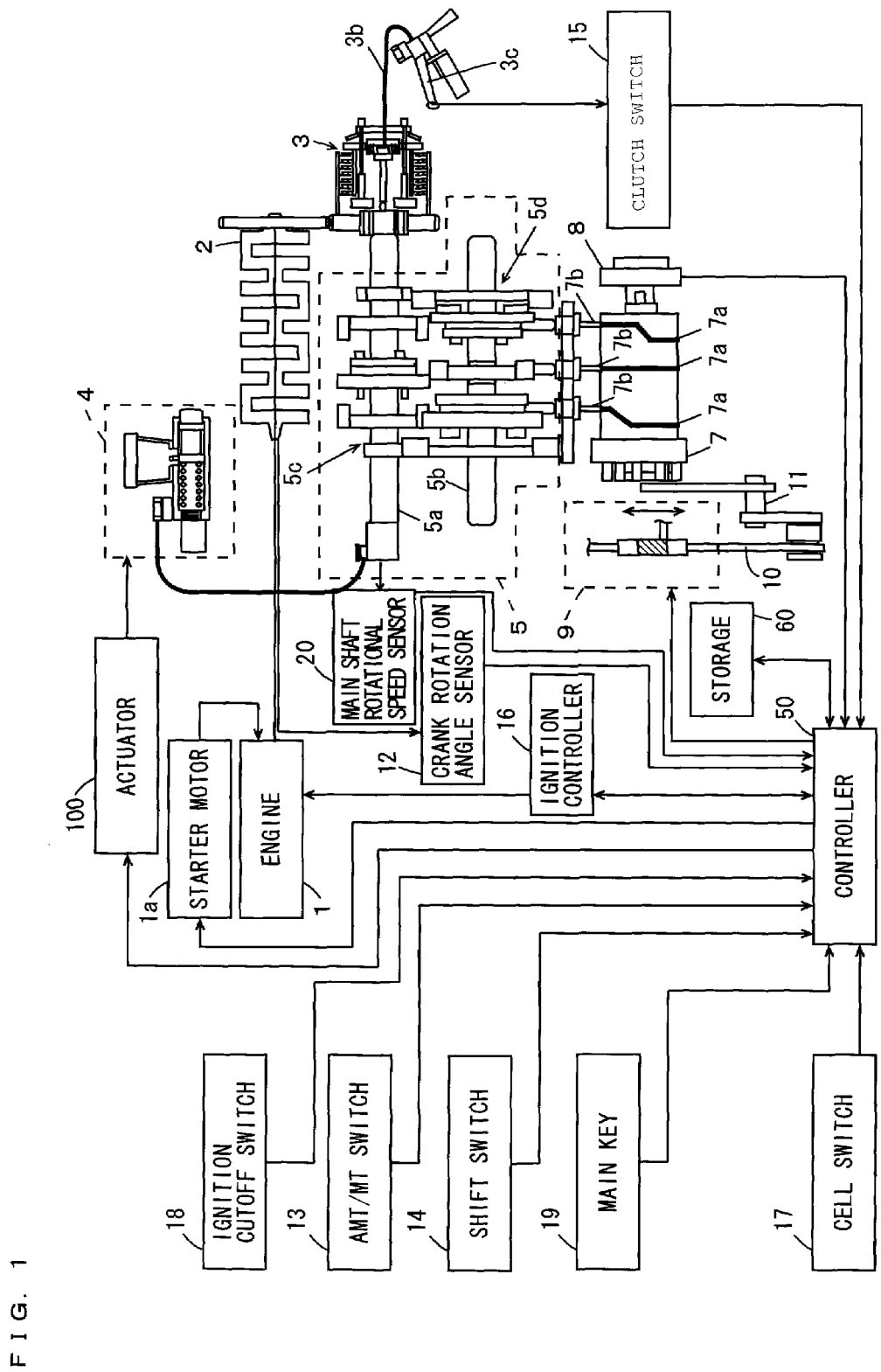
FIG. 1 is a schematic view showing the overall configuration of a clutch connection control apparatus according to a preferred embodiment of the present invention in a case where it is used for a motorcycle.

FIG. 1 is a schematic view showing the overall configuration of a clutch connection control apparatus (hereinafter referred to as a controller) according to a preferred embodiment in a case where it is used for a motorcycle. In the present preferred embodiment, an electric actuator 100, described below, is used.

As shown in FIG. 1, a rider turns a main key 19 on and then presses a cell switch 17 for a predetermined time period when he/she desires to start an engine 1. Thus, a current flows through a starter motor 1a from a battery (not shown), so that the starter motor 1a operates. This causes the engine 1 to be started.

Power outputted from the engine 1 is transmitted to a clutch 3 through a crank 2. In this case, the crank 2 transmits the power to the clutch 3 while carrying out deceleration in a predetermined ratio. A clutch lever 3c is connected to the clutch 3 through a hydraulic pipe 3b. The details of the configuration of the clutch 3 will be described below.

A transmission 5 includes a main shaft 5a and a drive shaft 5b. A multi-stage (e.g., six-stage) transmission gear group 5c is mounted on the main shaft 5a, and a multi-stage transmission gear group 5d is mounted on the drive shaft 5b. The power transmitted to the clutch 3 is transmitted to the main shaft 5a in the transmission 5.

The power transmitted to the main shaft 5a from the crank 2 through the clutch 3 is controlled by a clutch master cylinder 4. The clutch master cylinder 4 is operated by the electric actuator 100. The configuration of the clutch master cylinder 4 will be described below.

Description is herein made of a configuration in which the power transmitted to the main shaft 5a is transmitted to the drive shaft 5b.

Figure 2A:
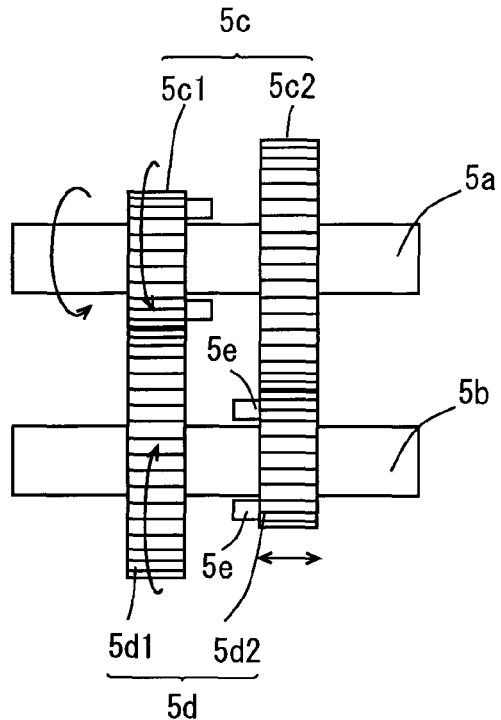
FIGS. 2A and 2B are schematic views showing a configuration in which power transmitted to a main shaft is transmitted to a drive shaft.
Figure 2B:
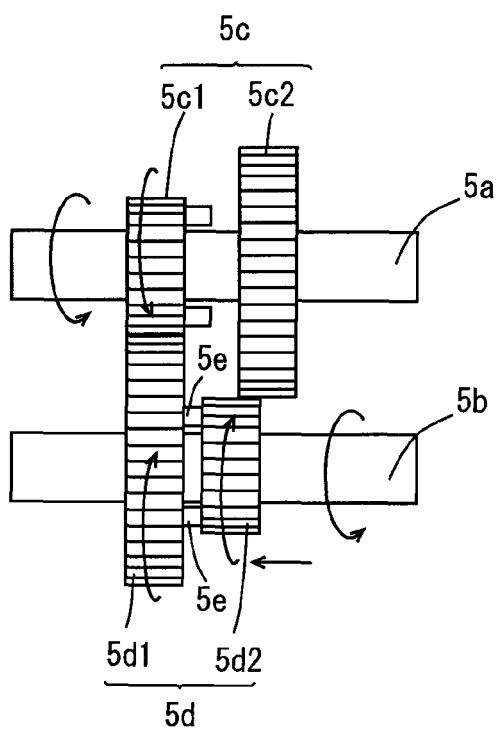

FIGS. 2A and 2B are schematic views showing the configuration in which the power transmitted to the main shaft 5a is transmitted to the drive shaft 5b.

In FIGS. 2A and 2B, the transmission gear group 5c includes a transmission gear 5c1 and a transmission gear 5c2, and the transmission gear group 5d includes a transmission gear 5d1 and a transmission gear 5d2.

The transmission gear 5c1 is fixed to the main shaft 5a. That is, if the main shaft 5a rotates, the transmission gear 5c1 also rotates. The transmission gear 5c2 is rotatably mounted on the main shaft 5a. That is, even if the main shaft 5a rotates, the transmission gear 5c2 does not rotate.

Furthermore, the transmission gear 5d1 is rotatably mounted on the drive shaft 5b. That is, even if the drive shaft 5b rotates, the transmission gear 5d1 does not rotate. The transmission gear 5d2 is fixed to the drive shaft 5b. That is, when the drive shaft 5b rotates, the transmission gear 5d2 also rotates.

As shown in FIG. 2A, the transmission gear 5c1 is spaced apart from the transmission gear 5c2, the transmission gear 5d2 is spaced apart from the transmission gear 5d1, and the transmission gear 5d1 is not fixed to the drive shaft 5b so that the power caused by the rotation of the main shaft 5a is not transmitted to the drive shaft 5b. A state where no power is transmitted to the drive shaft 5b from the main shaft 5a is referred to as a state where a gear is in a neutral position.

As shown in FIG. 2B, the transmission gear 5d2 is slid in the axial direction so as to come closer to the transmission gear 5d1, so that a convex-shaped dog 5e provided on a side surface of the transmission gear 5d2 is engaged with a concave-shaped dog hole (not shown) provided on a side surface of the transmission gear 5d1. Thus, the transmission gear 5d1 is fixed to the drive shaft 5b through the transmission gear 5d2, so that the power in the main shaft 5a is transmitted to the drive shaft 5b. Note that the transmission gear 5d2 is slid by a shift cam 7, described below. Details will be described below.

The power transmitted to the drive shaft 5b is transmitted to a rear wheel (not shown) through a drive chain (not shown) and a sprocket (not shown). This causes the motorcycle to travel.

In FIG. 1, the respective transmission gear ratios of the transmission gear group 5c and the transmission gear group 5d are changed by the rotation of the shift cam 7. The shift cam 7 has a plurality of (three in FIG. 1) cam grooves 7a. A shift fork 7b is mounted on each of the cam grooves 7a.

In the above-mentioned configuration, each of the shift forks 7b moves along the cam groove 7a as the shift cam 7 rotates, so that the transmission gear 5d2 shown in FIGS. 2A and 2B is slid in the axial direction and is engaged with the transmission gear 5d1.

Furthermore, a shift cam rotation angle sensor 8 is provided at an end of the shift cam 7. The shift cam rotation angle sensor 8 detects a gear position. Note that the shift cam rotation angle sensor 8 may be replaced with various types of switches, for example, attached to a known neutral position switch or transmission gear.

The rotation of the shift cam 7 is controlled by a hydraulic shift actuator 9. The hydraulic shift actuator 9 is connected to the shift cam 7 through a shift rod 10 and a link mechanism 11. The hydraulic shift actuator 9 is preferably configured by a combination of ON/OFF valves and can be up-shifted and down-shifted, for example. Note that the hydraulic shift actuator 9 may be replaced with an electric actuator such as a solenoid or an electric motor.

The crank 2 is provided with a crank rotation angle sensor 12. The crank rotation angle sensor 12 detects the rotational speed of the engine 1. Note that alternatives to a method of detecting the rotational speed of the engine 1 using the crank rotation angle sensor 12 include a method of detecting the rotational speed of the main shaft 5a using a main shaft rotational speed sensor 20 (FIG. 1) and a method of detecting the rotational speed of the drive shaft 5b using a drive shaft rotation angle sensor (not shown).

A controller 50 receives respective signals from an AMT/MT switch 13, a shift switch 14, a clutch switch 15, a cell switch 17, and an ignition cutoff switch 18. A storage 60 stores a pressure value within a cylinder 4b, described below, in the clutch master cylinder 4 or the like. The details will be described below.

Furthermore, the controller 50 controls an ignition controller 16 in order to adjust an output (power) of the engine 1. Note that the controller 50 may control the output of the engine 1 by adjusting a fuel injection device or a throttle valve (both are not illustrated).

The rider presses the AMT/MT switch 13 when he/she desires to switch a connection/disconnection operation of the clutch 3 to an automatic or manual operation. In this case, when the rider presses the AMT/MT switch 13, the AMT/MT switch 13 is switched to a mode in which the connection/disconnection operation of the clutch 3 is automatically performed (an automated manual transmission mode; hereinafter abbreviated as an AMT mode) or a mode in which the connection/disconnection operation of the clutch 3 is manually performed (a manual transmission mode; hereinafter abbreviated as an MT mode).

Furthermore, the rider presses the shift switch 14 when he/she desires to operate a gear shift in the AMT mode. The shift switch 14 is composed of an up-shifting switch and a down-shifting switch. The rider presses the shift switch 14, which causes the controller 50 to control the respective operations of the actuator 100, the hydraulic shift actuator 9, and the engine 1 on the basis of parameters such as the rotational speed of the engine 1.

The clutch switch 15 is turned on when the rider disconnects the clutch 3 using the clutch lever 3c in the MT mode. The rider presses the ignition cutoff switch 18 when he/she desires to immediately stop the engine 1. Furthermore, the rider operates the main key 19 when he/she desires to bring the engine 1 into a startable state and desires to stop the engine 1.

In the AMT mode, the rider starts the engine 1 with the gear in a neutral position. When the rider operates the shift switch 14 to designate a gear position, the controller 50 controls the actuator 100 on the basis of the parameters such as the rotational speed of the engine 1, to automatically perform the connection operation of the clutch 3. This allows the rider to start moving the motorcycle without manually performing the connection operation of the switch 3.

Figure 3:
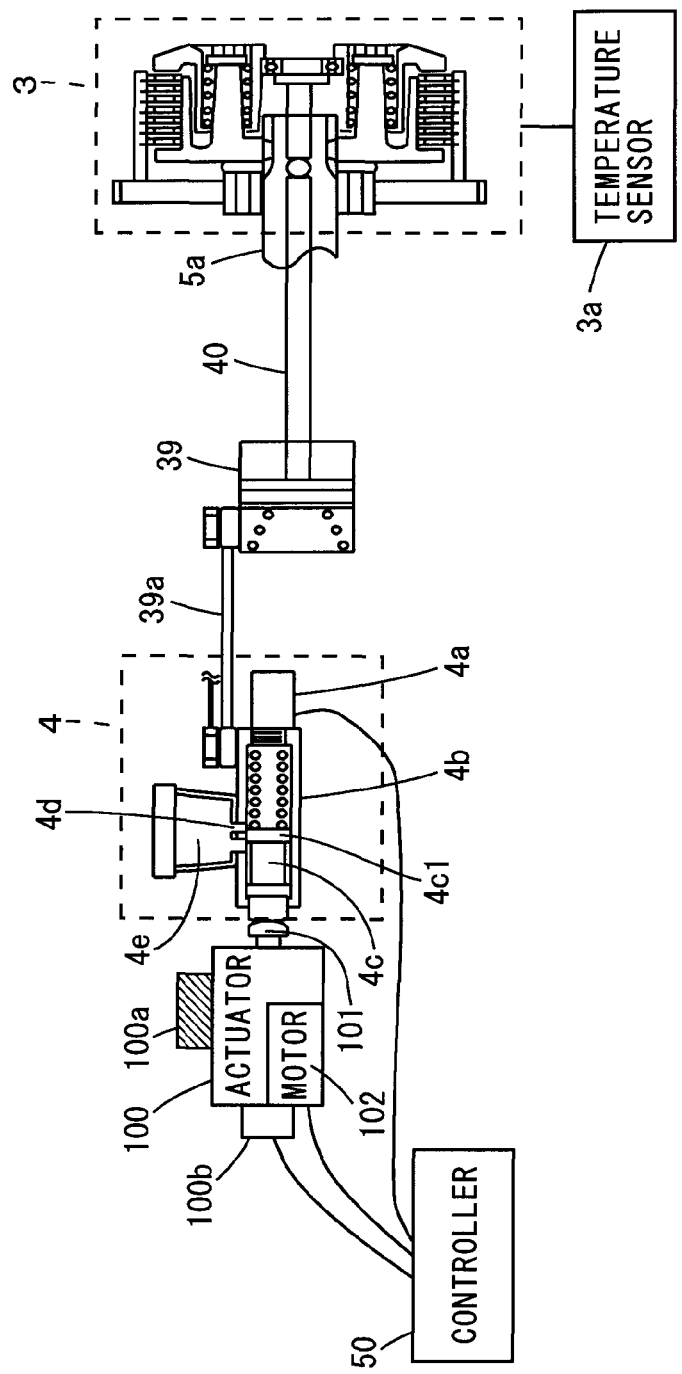
FIG. 3 is a schematic view showing a configuration in which a clutch is brought into a connected state and a disconnected state using an actuator.

Mechanism for Bringing the Clutch into a Connected State and a Disconnected State FIG. 3 is schematic view showing a configuration in which the clutch 3 is brought into a connected state and a disconnected state using the actuator 100.

As shown in FIG. 3, the clutch master cylinder 4 includes a pressure sensor 4a, a cylinder 4b, a master piston 4c provided in the cylinder 4b, a fluid seal 4c1 attached to a tip portion of the master piston 4c, an air opening piping 4d, and a reservoir tank 4e communicating with the air opening piping 4d. Note that the cylinder 4b is filled with an incompressible liquid (not shown).

The pressure sensor 4a detects pressure (hydraulic pressure) within the cylinder 4b in the clutch master cylinder 4. The results of the detection of the hydraulic pressure are provided to the controller 50. The controller 50 controls the connected state and the disconnected state of the clutch 3 on the basis of the provided results of the detection.

The actuator 100 includes a rod 101 for pressing the master piston 4c in the clutch master cylinder 4. A position sensor 100a that detects the movement amount of the master piston 4c (or the movement amount of the rod 101) is attached to the actuator 100.

The actuator 100 includes a motor 102 that operates under the control of the controller 50. Furthermore, the actuator 100 is provided with a rotation angle sensor 100b that detects the rotation angle of the motor 102.

The results of the detection of the movement amount are provided to the controller 50. The controller 50 controls the connected state and the disconnected state of the clutch 3 on the basis of the provided results of the detection. Note that when the connected state and the disconnected state of the clutch 3 are controlled using the pressure sensor 4a, the position sensor 100a need not be provided.

Furthermore, the connected state and the disconnected state of the clutch 3 may be controlled by replacing the position sensor 100a and the pressure sensor 4a with a displacement sensor that measures the movement amount of a pressure plate 33, described below, in the clutch 3. Alternatively, the connected state and the disconnected state of the clutch 3 may be controlled by measuring the value of a current to be supplied to the actuator 100.

The rod 101 in the actuator 100 is moved by a command from the controller 50. The rod 101 is brought into contact with the master piston 4c in the clutch master cylinder 4. The rod 101 presses the master piston 4c so that the master piston 4c moves in the cylinder 4b.

Furthermore, the air opening piping 4d is branched from the cylinder 4b in the clutch master cylinder 4. The cylinder 4b is connected to a servo unit 39 through a piping 39a. The servo unit 39 doubles a load at which the master piston 4c is pressed by the rod 101 in the actuator 100 by moving in the cylinder 4b, and transmits the doubled load to a push rod 40.

When the fluid seal 4c1 in the master piston 4c moves in the cylinder 4b in such a direction as to block an inlet to the air opening piping 4d, pressure generated in the clutch master cylinder 4 is transmitted to the servo unit 39. That is, pressure against a load applied by a return spring 34 (FIG. 4), described below, defining the clutch 3 is generated within the servo unit 39. When the load applied by the return spring 34 and the pressure within the servo unit 39 are equal to each other, the clutch 3 enters the disconnected state. The details will be described below.

On the other hand, when the fluid seal 4c1 in the master piston 4c does not block the inlet to the air opening piping 4d, the inside of the cylinder 4b and the inside of the reservoir tank 4e communicate with each other. That is, the pressure within the cylinder 4b is equal to atmospheric pressure, so that the pressure generated in the clutch master cylinder 4 is not transmitted to the servo unit 39.

Normally, a pressure plate 33 (FIGS. 4A and 4B), described below, in the clutch 3 is always biased in the direction in which the clutch 3 is connected by the return spring 34. In such a configuration, when the pressure within the servo unit 39 is not greater than the load applied by the return spring 34, the clutch 3 enters the connected state. The details will be described below.

The servo unit 39 is connected to the clutch 3 through the push rod 40 inserted within the main shaft 5a. That is, the servo unit 39 moves the push rod 40 depending on the pressure generated in the clutch master cylinder 4.

This causes the push rod 40 to press the pressure plate 33, described below. In such a configuration, the clutch 3 enters the disconnected state when the push rod 40 presses the pressure plate 33, while entering the connected state when it does not press the pressure plate 33. The details will be described below.

The direction in which the push rod 40 moves when the push rod 40 presses the pressure plate 33 is referred to as a clutch disconnection direction, and the direction opposite thereto is referred to a clutch connection direction.

Configuration of the Clutch

The configuration of the clutch 3 will now be described while referring to the drawings.

Figure 4B:
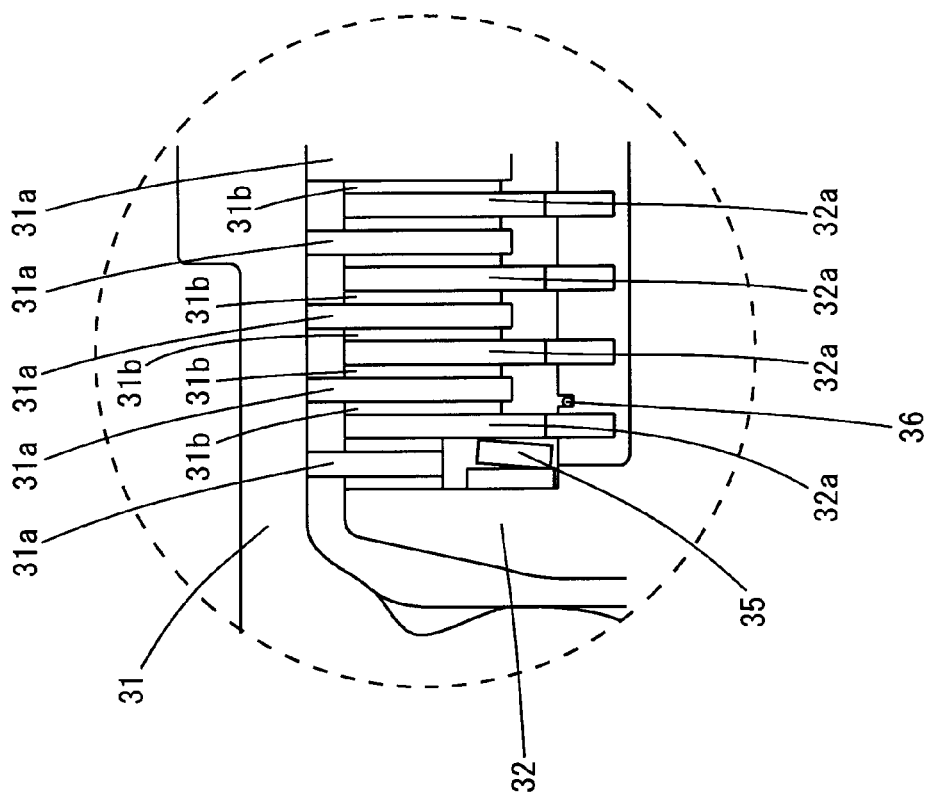
FIGS. 4A and 4B are schematic views showing the detailed configuration of a clutch.
Figure 4A:
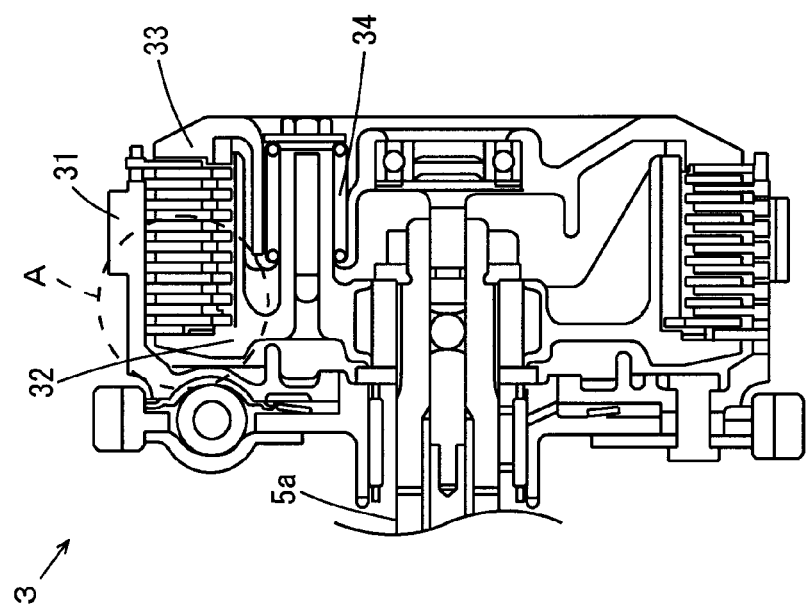

FIGS. 4A and 4B are schematic views showing the detailed configuration of the clutch 3. FIG. 4A is a cross-sectional view of the overall clutch 3, and FIG. 4B is an enlarged view of a region A indicated by a dotted line in FIG. 4A.

As shown in FIG. 4A, the clutch 3 mainly includes a clutch housing 31, a boss clutch 32, a pressure plate 33, and a return spring 34.

The clutch housing 31 is connected to the crank 2 in FIG. 1, and rotates in synchronization with the crank 2.

The clutch housing 31 has a plurality of slits (not shown) provided in its inner periphery, and a friction plate 31a is fitted in each of the slits in FIG. 4B. The friction plates 31a rotate in synchronization with the clutch housing 31.

On the other hand, the boss clutch 32 is fitted in the main shaft 5a. The boss clutch 32 has a plurality of slits (not shown) provided in its outer periphery, and a clutch plate 32a is fitted in each of the slits. The clutch plates 32a rotate in synchronization with the boss clutch 32.

The plurality of friction plates 31a and the plurality of clutch plates 32a are alternately provided such that each of the clutch plates 32a is sandwiched between the adjacent friction plates 31a.

A space between the adjacent friction plate 31a and clutch plate 32a is filled with oil (not shown). That is, the clutch 3 in the present preferred embodiment is a wet multi-plate friction clutch.

The pressure plate 33 is attached to the boss clutch 32 with the return spring 34 in FIG. 4A interposed therebetween.

Here, the return spring 34 usually biases the pressure plate 33 in the clutch connection direction such that the friction plates 31a and the clutch plates 32a are respectively brought into contact with each other. Note that contact members 31b composed of a paper material, a cork material, or the like are respectively provided on both surfaces of each of the friction plates 31a. The friction plates 31a and the clutch plates 32a are respectively brought into contact with each other with the contact members 31b sandwiched therebetween.

By such a configuration, power from the crank 2 (power on the input side) is transmitted as power on the output side to the boss clutch 32 depending on a frictional force produced between the adjacent friction plate 31a and clutch plate 32a through the clutch housing 31.

Furthermore, as shown in FIG. 4B, a belleville cushion spring 35 is attached to an upper surface of the boss clutch 32. A load applied by the cushion spring 35 is exerted in the direction opposite to the above-mentioned load applied by the return spring 34. Note that the elastic coefficient of the return spring 34 is less than the elastic coefficient of the cushion spring 35. However, the load applied by the return spring 34 is greater than the load applied by the cushion spring 35.

The role of the cushion spring 35 is to inhibit vibrations generated from the clutch 3 (Clutch Judder) from being generated when the clutch 3 is brought into a half clutched state when the vehicle starts moving. Note that clutch judder is generally generated when there is a contact failure or the like on a surface of the clutch plate 32a.

A set ring 36 that serves as a stopper when the cushion spring 35 presses the clutch plate 32a on the outermost side in the direction opposite to the position where the pressure plate 33 is arranged is provided so as to come closer to the clutch plate 32a on the outermost side.

As described in the foregoing, the controller 50 shown in FIG. 3 can adjust the movement amount of the push rod 40 by the servo unit 39 by controlling the rod 101 in the actuator 100. Thus, a load against the return spring 34 in the clutch 3 is generated.

By such a configuration, the controller 50 controls the movement amount of the push rod 40, that is, the load against the return spring 34 so that the push rod 40 can and cannot press the pressure plate 33. Thus, a frictional force between the friction plate 31a and the clutch plate 32a can be changed. This causes the connected state (including the half-clutched state) and the disconnected state of the clutch 3 to be switched.

Shift of the Clutch from Connected State to Disconnected State

The function of components defining the clutch 3 in a case where the clutch 3 shifts from the connected state to the disconnected state will now be described.

Figure 5A:
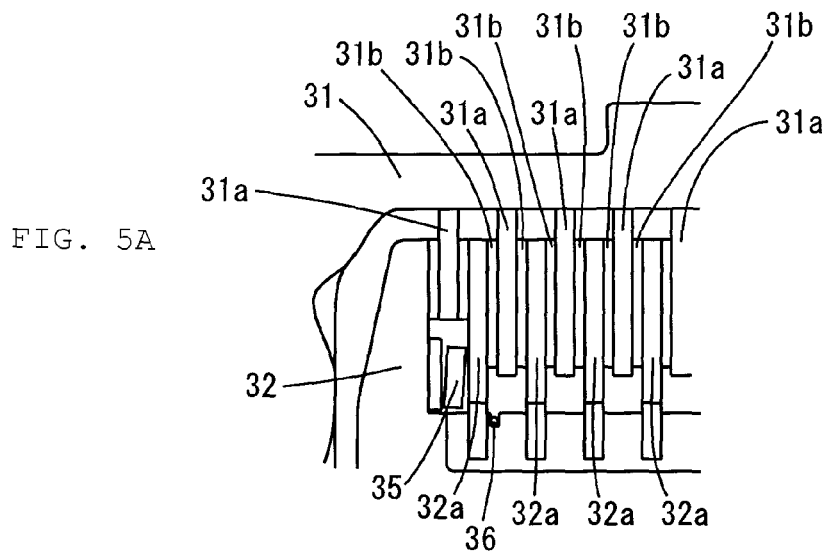
FIGS. 5A-5C are schematic views showing the function of components defining a clutch in a case where the clutch shifts from the connected state to the disconnected state.
Figure 5B:
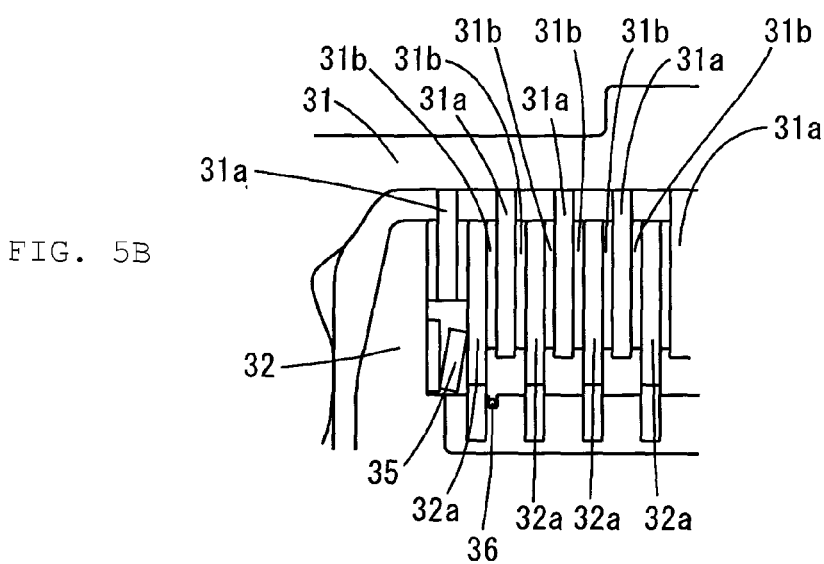
Figure 5C:
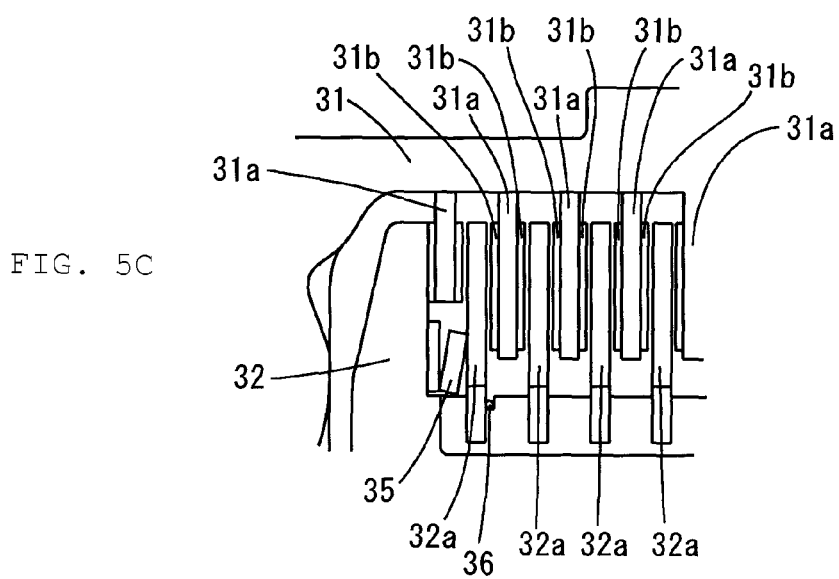

FIGS. 5A to 5C are schematic views showing the function of the components defining the clutch 3 in a case where the clutch 3 shifts from the connected state to the disconnected state.

FIG. 5A illustrates a case where the clutch 3 is in the connected state, FIG. 5B illustrates a case where the clutch 3 is in the half clutched state in the connected state, and FIG. 5C illustrates a case where the clutch 3 is in the disconnected state.

As shown in FIG. 5A, when the clutch 3 is in the connected state, the difference between the load applied by the return spring 34 for biasing the pressure plate 33 and the load applied by the cushion spring 35 is greater than the load applied by the push rod 40 for pressing the pressure plate 33.

As a result, the pressure plate 33 does not move, so that the friction plates 31a and the clutch plates 32a are respectively brought into contact with each other with the contact members 31b sandwiched therebetween. Thus, power on the input side from the crank 2 is transmitted as power on the output side to the boss clutch 32 through the clutch housing 31. Note that when the clutch 3 is in the connected state, the cushion spring 35 is substantially parallel to the clutch plates 32a by the load for pressing the pressure plate 33.

When the load applied by the push rod 40 is further increased from the state shown in FIG. 5A, the load and the above-mentioned difference between the loads respectively applied by the return spring 34 and the cushion spring 35 are balanced.

When the load applied by the push rod 40 is further increased, the load becomes greater than the difference. As a result, the pressure plate 33 moves in the direction in which the return spring 34 contracts. At the same time, the cushion spring 35 is inclined to the clutch plates 32a depending on the movement amount of the pressure plate 33. Thus, the spring length of the cushion spring 35 reaches a set length that is a value determined when the cushion spring 35 is assembled into the boss clutch 32.

Furthermore, when the load applied by the push rod 40 is further increased from the state shown in FIG. 5B, the spring length of the cushion spring 35 has already reached the set length. Therefore, the load applied by the push rod 40 for moving the pressure plate 33 is equal to the load applied by the return spring 34.

As a result, the friction plates 31a and the clutch plates 32a are respectively brought out of contact with each other (spaced apart from each other), as shown in FIG. 5C. That is, the clutch 3 enters the disconnected state. As a result, the power from the crank 2 is not transmitted to the boss clutch 32.

Detection of Touch Point (TP) Preparation Position
(5-a) Pressure within Clutch Master Cylinder FIG. 6 is an explanatory view showing a method of detecting a touch point preparation position.

In FIG. 6, the horizontal axis indicates an elapsed time period, and the vertical axis indicates pressure within the cylinder 4b in the clutch master cylinder 4. Note that FIG. 6 shows the change in the pressure within the cylinder 4b in a case where the clutch 3 shifts from the connected state to the disconnected state, and the pressure is detected by the pressure sensor 4a.

In FIG. 6, the change in the pressure within the cylinder 4b is indicated by a solid line. As shown in FIG. 6, the pressure within the cylinder 4b in the clutch master cylinder 4 steeply rises from an initial value P0 (=0), and reaches pressure P1 in an elapsed time period t1. The reason for this is as follows.

Even if the actuator 100 moves the master piston 4c in the cylinder 4b in the clutch disconnection direction at a substantially constant speed with the clutch 3 connected, as described above, the pressure plate 33 does not start to move until the load applied by the push rod 40 for pressing the pressure plate 33 and the difference between the loads respectively caused by the return spring 34 for biasing the pressure plate 33 and the cushion spring 35 are equal to each other.

Therefore, the master piston 4c in the clutch master cylinder 4 compresses the incompressible liquid within the cylinder 4b, so that the pressure within the cylinder 4b steeply rises.

Then, when the actuator 100 further moves the master piston 4c in the cylinder 4b in the clutch disconnection direction at a substantially constant speed, the pressure within the cylinder 4b gradually rises from P1, to reach pressure P2 (P2>P1) in an elapsed time period t2. In this case, a rate of the pressure increase from the pressure P1 to the pressure P2 is less than a rate of the pressure increase from the pressure P0 to the pressure P1. The reason for this is as follows. Note that the rate of the pressure increase from the pressure P0 to the pressure P1 corresponds to a first value, the rate of the pressure increase from the pressure P1 to the pressure P2 corresponds to a second value, and a rate of the pressure increase from the pressure P2 to pressure P3, described below, corresponds to a third value.

As described in the foregoing, when the actuator 100 further moves the master piston 4c in the cylinder 4b in the clutch disconnection direction at a substantially constant speed, that is, when the load applied by the push rod 40 for pressing the pressure plate 33 is further increased, the load is greater than the above-mentioned difference between the loads respectively applied by the return spring 34 and the cushion spring 35. As a result, the pressure plate 33 moves in the direction in which the return spring contracts. At the same time, the spring length of the cushion spring 35 is increased by the same amount as the movement amount of the pressure plate 33.

The load applied by the push rod 40 for pressing the pressure plate 33, that is, the change in the pressure within the cylinder 4b is the change in the difference that is proportional to the movement amount of the pressure plate 33, so that the rate of the pressure increase from the pressure P1 to the pressure P2 is less than the rate of the pressure increase from the pressure P0 to the pressure P1.

Then, when the actuator 100 further moves the master piston 4c in the cylinder 4b in the clutch disconnection direction at a substantially constant speed, the pressure within the cylinder 4b hardly rises from the pressure P2, to reach the pressure P3 (P3>P2) in a certain elapsed time period. In this case, the rate of the pressure increase from the pressure P2 to the pressure P3 is less than the rate of the pressure increase from the pressure P1 to the pressure P2. The reason for this is as follows.

As described in the foregoing, when the actuator 100 further moves the master piston 4c in the cylinder 4b in the clutch disconnection direction at a substantially constant speed, that is, when the load applied by the push rod 40 for pressing the pressure plate 33 is further increased, the spring length of the cushion spring 35 has already reached the set length. Therefore, the load applied by the push rod 40 for pressing the pressure plate 33, that is, the change in the pressure within the cylinder 4b is the change in the pressure by the return spring 34, which is proportional to the movement amount of the pressure plate 33. As a result, the rate of the pressure increase from the pressure P2 to the pressure P3 is less than the rate of the pressure increase from the pressure P1 to the pressure P2.

(5-b) Method of Detecting Touch Point Preparation Position Using Pressure within Clutch Master Cylinder The touch point means a stage in which power starts to be transmitted to the clutch 3. Although the rider inherently desires to start moving the motorcycle, for example, smoothly and quickly by detecting the touch point to control the connected state and the disconnected state of the clutch 3, the touch point differs from motorcycle to motorcycle due to changes in coefficients of friction by wear of the friction plates 31a and the clutch plates 32a in the clutch 3.

Therefore, in the present preferred embodiment, a stage preceding the touch point, that is, a preceding stage in which power starts to be transmitted to the clutch 3 is detected.

The preceding stage in which power starts to be transmitted to the clutch 3 can be determined from the change in the pressure within the cylinder 4b. That is, the above-mentioned pressure P2 within the cylinder 4b generated immediately before power starts to be transmitted to the clutch 3 is detected.

Although start control of the motorcycle can be carried out on the basis of the detected pressure P2, such pressure control may, in some cases, make it difficult to carry out start control of the motorcycle.

Therefore, in the present preferred embodiment, it is preferable that start control of the motorcycle is carried out on the basis of a position L1, described below, of the rod 101 when the pressure within the cylinder 4b is P2. Note that when it is not difficult to carry out start control on the basis of the pressure P2, start control may be carried out on the basis of the pressure P2. The above-mentioned position L1 is referred to as a touch point preparation position.

As described in the foregoing, the pressure P2 is detected on the basis of the rate of the pressure increase calculated from the change in the pressure within the cylinder 4b. The position L1 of the rod 101 in a case where the pressure within the cylinder 4b is P2 is stored in the storage 60 as a touch point preparation position.

Note that the pressure P2, the rotation angle of the motor 101 at the pressure P2, the position of the master piston 4c at the pressure P2, or the position of the push rod 40 at the pressure P2 may be stored in the storage 60 as a touch point preparation position, and start control may be carried out on the basis of the touch point preparation position. The position of the push rod 40 is detected by a position sensor (not shown) or the like.

Detection Flow of Touch Point Preparation Position

The flow of detection of a touch point preparation position will now be described while referring to a flow chart.

Figure 7:
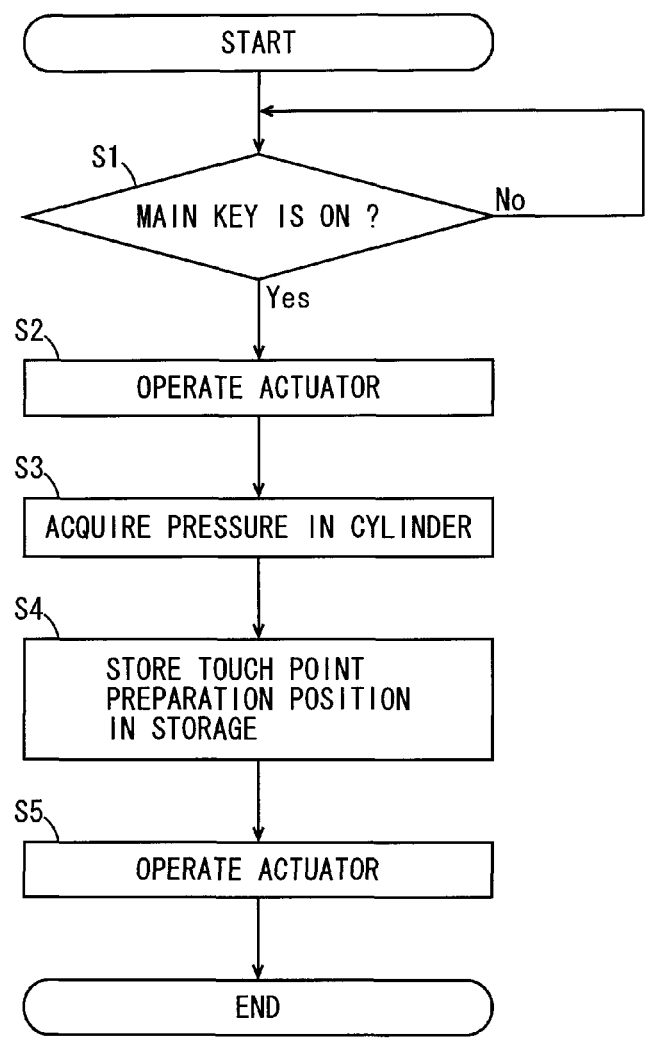
FIG. 7 is a flow chart showing a method of detecting a touch point preparation position.

FIG. 7 is a flow chart showing a method of detecting a touch point preparation position.

As shown in FIG. 7, the controller 50 first determines whether or not a rider turns the main key 19 on (step S1). When the main key 19 is not turned on, the controller 50 waits until the main key 19 is turned on.

When the rider turns the main key 19 on, the controller 50 operates the actuator 100 (step S2). In this case, the controller 50 controls the actuator 100 such that the clutch 3 shifts from the connected state to the disconnected state.

Then, the controller 50 acquires the pressure within the cylinder 4b in the clutch master cylinder 4 from the pressure sensor 4a (step S3).

Then, the controller 50 calculates the rate of the pressure increase on the basis of the acquired pressure within the cylinder 4b, and then causes the storage 60 to store the position L1 of the rod 101 at the time point where the rate of the pressure increase is changed from the second value to the third value (at the pressure P2) as a touch point preparation position (step S4).

Then, the controller 50 operates the actuator 100 (step S5). In this case, the controller 50 controls the actuator 100 such that the clutch 3 shifts from the connected state to the disconnected state. This ends the process.

Start Control of Motorcycle in a Case Where Touch Point Preparation Position is Used Start control of the motorcycle based on the position L1 of the rod 101 will be described below.

Figure 8:
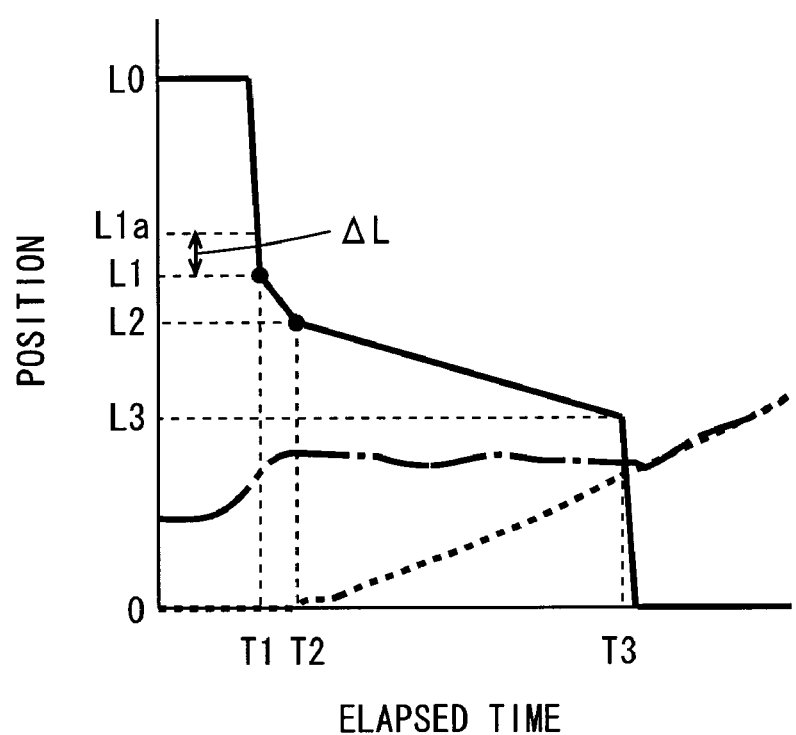
FIG. 8 is a graph showing the relationship between the position of a rod in an actuator and an elapsed time period.
Figure 9:
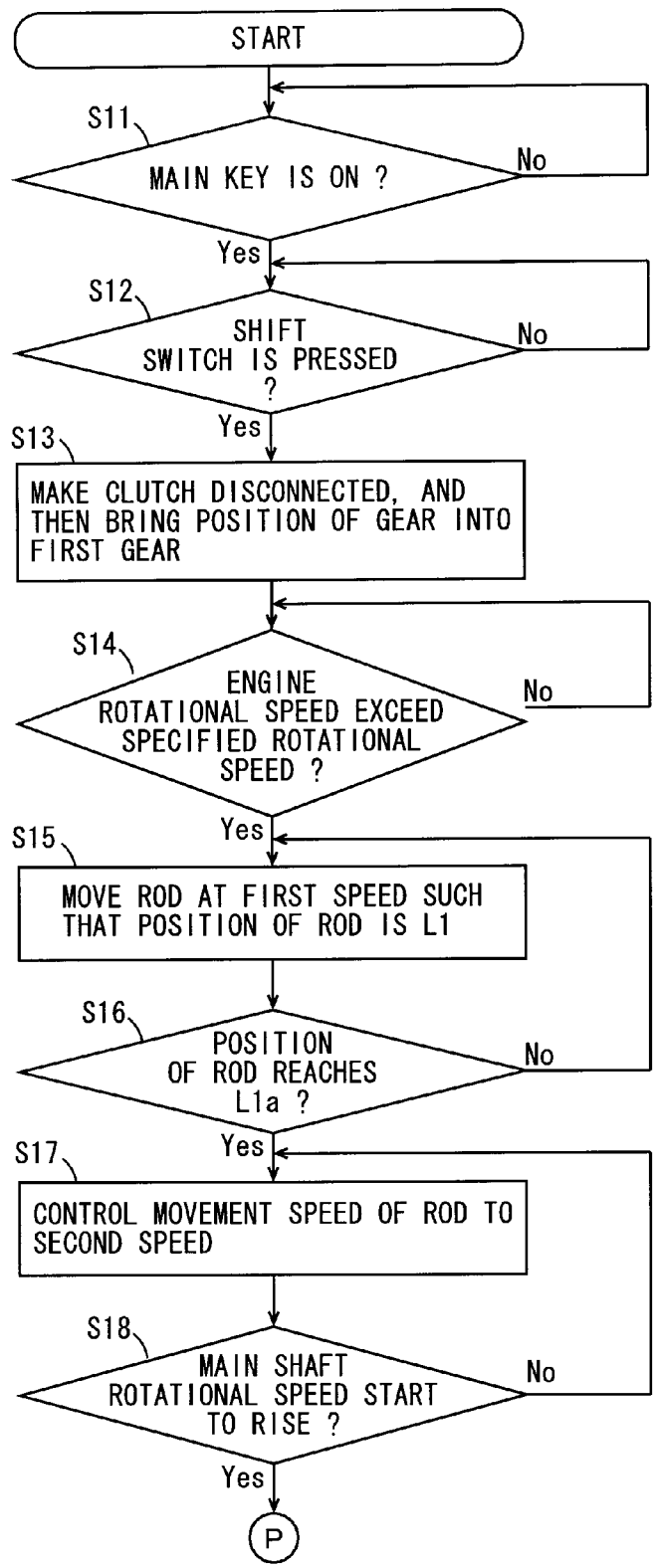
FIG. 9 is a flow chart showing the flow of start control of the motorcycle.
Figure 10:
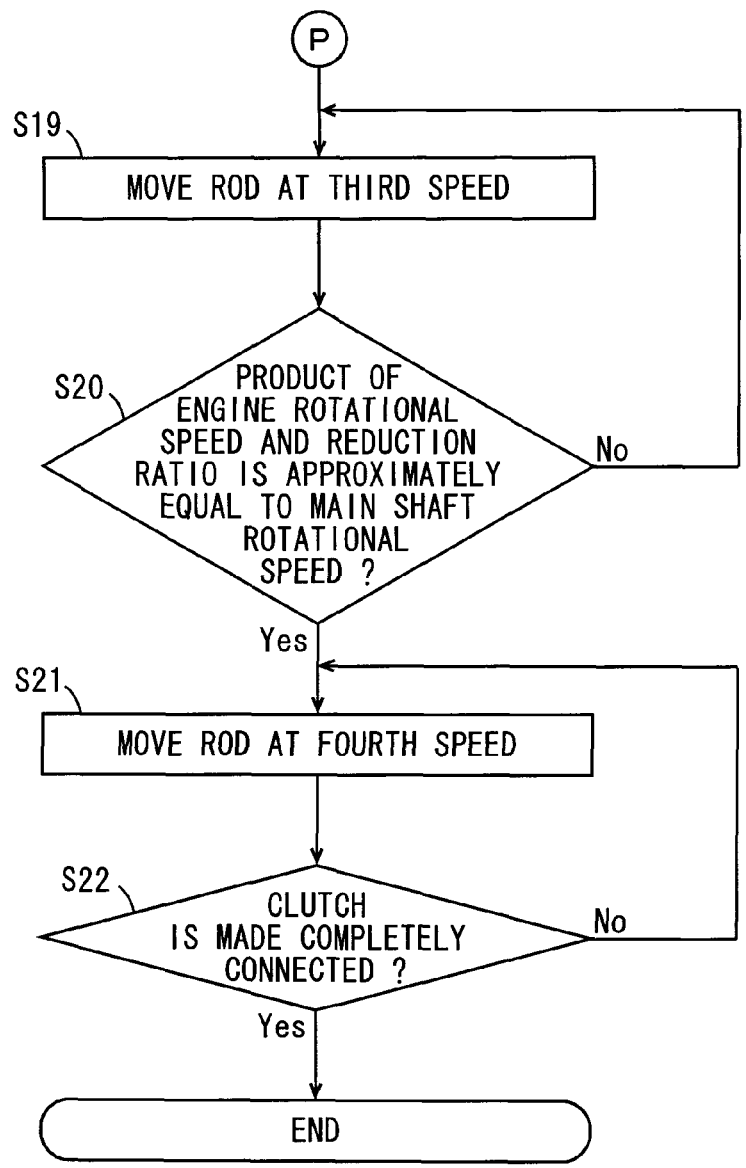
FIG. 10 is a flow chart showing the flow of start control of the motorcycle.

FIG. 8 is a graph showing the relationship between the position of the rod 101 in the actuator 100 and an elapsed time period, and FIGS. 9 and 10 are flow charts showing the flow of start control of the motorcycle.

Note that the position of the rod 101 in FIG. 8 indicates each position in a case where the position of the rod 101 is zero when the clutch 3 enters the connected state, while being the maximum value L0 when the clutch 3 enters the disconnected state. That is, L0>L1>L2>L3>0 in FIG. 8.

In FIG. 8, the change in the position of the rod 101 relative to the elapsed time period is indicated by a solid line. Note that the rotational speed of the engine 1 is indicated by a one-dot and dash line, the rotational speed of the main shaft 5a is indicated by a dotted line, and both the units of the rotational speeds on the vertical axis are not shown.

First, as shown in FIG. 9, the controller 50 determines whether or not the rider turns the main key 19 on (step S11). When the rider does not turn the main key 19 on, the controller 50 waits until the main key 19 is turned on.

On the other hand, when the rider turns the main key 19 on, the controller 50 determines whether or not the rider presses the shift switch 14 (step S12). In this case, the rider presses an up-shifting switch in the shift switch 14 once in order to bring the position of the gear into the first gear.

When the rider does not press the shift switch 14 in the process in step S12, the controller 50 waits until the shift switch 14 is pressed.

On the other hand, when the rider presses the shift switch 14, the controller 50 controls the actuator 100 to bring the clutch 3 into the disconnected state and then bring the position of the gear into the first gear (step S13). In this case, the position of the rod 101 reaches its maximum value L0, as shown in FIG. 8.

Then, the controller 50 determines whether or not the rotational speed of the engine 1 exceeds a specified rotational speed (e.g., 1300 rpm) (step S14). In this case, the rider can increase the rotational speed of the engine 1 by operating a throttle grip. When the rotational speed of the engine 1 does not exceed the specified rotational speed, the controller 50 waits until the rotational speed of the engine 1 exceeds the specified rotational speed.

On the other hand, when the rotational speed of the engine 1 exceeds the specified rotational speed, the controller 50 moves the rod 101 in the clutch connection direction at a first speed (the highest speed, as compared with a speed, described below) such that the position of the rod 101 reaches L1 (step S15).

The engine 1 can be inhibited from turning freely in a time period elapsed until the clutch 3 enters the connected state by moving the rod 101 in the clutch connection direction at the first speed.

Note that the process in step S15 may be carried out on the basis of the opening of the throttle grip, which is operated by the rider, for example, in place of the determination whether or not the rotational speed of the engine 1 exceeds the specified rotational speed. Alternatively, the process in step S15 may be carried out on the basis of both the specified rotational speed and the opening of the throttle grip.

Then, the controller 50 determines whether or not the position of the rod 101 reaches L1a (step S16). Here, the position L1a is set to a position closer to the position L0 by a predetermined distance ΔL than the position L1, as shown in FIG. 8. That is, L0>L1a>L1. The position L1a will be described below. When the position of the rod 101 does not reach L1*a*, the controller 50 is returned to the process in step S15.

On the other hand, when the position of the rod 101 reaches L1*a*, the controller 50 controls the movement speed of the rod 101 to the second speed (<the first speed) (step S17).

The reason why the movement speed of the rod 101 is controlled from the first speed to the second speed at the time point where the position of the rod 101 is not L1 but L1*a* is as follows. When the rotational speed of the motor 102 in the actuator 100 is switched in order to change the movement speed of the rod 101 from the first speed to the second speed, delay occurs from the time point where the rod 101 is controlled from the first speed to the second speed by overshoot of the rotational speed of the motor 101, for example, to the time point where the movement speed of the rod 101 actually becomes the second speed. When the movement speed of the rod 101 is controlled from the first speed to the second speed at the time point where the position of the rod 101 reaches L1, therefore, the movement speed of the rod 101 becomes the second speed after the position of the rod 101 exceeds L1. Therefore, the movement speed of the rod 101 is controlled from the first speed to the second speed at the time point where the position of the rod 101 reaches L1*a* such that the movement speed of the rod 101 becomes the second speed at the time point where the position of the rod 101 reaches L1. The predetermined distance ΔL is the distance the rod 101 moves in a time period elapsed from the time point where the movement speed of the rod 101 is controlled from the first speed to the second speed until the movement speed of the rod 101 actually becomes the second speed.

In this case, the position of the rod 101 is L2 (a touch point) in an elapsed time period T2, as shown in FIG. 8. That is, power starts to be transmitted to the clutch 3.

The rod 101 is thus moved in the clutch connection direction at the second speed lower than the first speed, which can inhibit the motorcycle from running out when the speed at which the rod 101 is moved is high and inhibit the engine 1 from turning freely when the speed at which the rod 101 is moved is low.

Then, the controller 50 determines whether or not the rotational speed of the main shaft 5*a* starts to rise (step S18). Note that the controller 50 acquires the rotational speed of the main shaft 5*a* from a main shaft rotation angle sensor (not shown). When the rotational speed of the main shaft 5*a* does not start to rise, the controller 50 is returned to the process in step S17.

On the other hand, when the rotational speed of the main shaft 5*a* starts to rise, the controller 50 moves the rod 101 in the clutch connection direction at the third speed (<the second speed) (step S19 in FIG. 10).

By thus moving the rod 101 in the clutch connection direction at the third speed lower than the second speed, the rider does not have an uncomfortable feeling when he/she starts moving the motorcycle, and the engine is prevented from stalling.

Then, the controller 50 determines whether or not the product of the rotational speed of the engine 1 and the reduction gear ratio is approximately equal to the rotational speed of the main shaft 5*a* (step S20). When the product of the rotational speed of the engine 1 and the reduction gear ratio is not approximately equal to the rotational speed of the main shaft 5*a*, the controller 50 is returned to the process in the foregoing step S19.

On the other hand, when the product of the rotational speed of the engine 1 and the reduction gear ratio is approximately equal to the rotational speed of the main shaft 5*a* (when the position of the rod 101 is L3 in an elapsed time period T3 in FIG. 8), the controller 50 moves the rod 101 in the clutch connection direction at the fourth speed (>the third speed) (step S21). Thus, the clutch 3 enters a completely connected state. The completely connected state means a state where approximately 100% of a torque generated by the rotation of the engine 1 is transmitted to the clutch 3. Note that the rod 101 may be moved at the same speed as the first speed.

By thus moving the rod 101 in the clutch connection direction at the fourth speed higher than the third speed, it is possible to prevent the behavior of the vehicle from being changed by the clutch 3 slipping when the rider quickly opens the throttle grip and prevent the rider from having an uncomfortable feeling before and after the product of the rotational speed of the engine 1 and the reduction gear ratio is equal to the rotational speed of the main shaft 5*a*.

Then, the controller 50 determines whether or not the clutch 3 enters the completely connected state (step S22). In this case, the determination is made depending on whether or not the position of the rod 101 is zero.

The controller 50 is returned to the process in the foregoing step S21 when the clutch 3 does not enter the completely connected state, while terminating the process for start control when the clutch 3 enters the completely connected state.

Note that the clutch 3 is lubricated by oil. The viscosity of the oil varies with temperature. When the temperature of the oil is low, friction within the clutch 3 increases, so that the value of the position (touch point) L2 increases. Therefore, it is preferable that a temperature sensor 3*a* for detecting the oil temperature is provided to correct the value of the position L1 stored as the touch point preparation position in the storage 60 on the basis of the detected value of the temperature sensor 3*a*, as shown in FIG. 3. The temperature sensor 3*a* can be attached at any position of an oil circulating system.

For example, the value of the position L1 is multiplied by a first correction coefficient $\alpha 1$ ($\alpha 1 > 1$) when the temperature of the oil is 40° C. to 60° C., is multiplied by a second correction coefficient $\alpha 2$ ($\alpha 2 > \alpha 1$) when it is 20° C. to 40° C., is multiplied by a third correction coefficient $\alpha 3$ ($\alpha 3 > \alpha 2$) when it is 0° C. to 20° C., and is multiplied by a fourth correction coefficient $\alpha 4$ ($\alpha 4 > \alpha 3$) when it is less than 0° C. When the temperature of the oil is not less than 60° C., the value of the position L1 is not corrected. Note that the relationship between the temperature of the oil and the correction coefficient is not limited to the above-mentioned example. For example, the relationship between the temperature of the oil and the correction coefficient may be stored by a function in the storage 60, to correct the value of the position L1 using the detected value of the temperature sensor 3*a* and the function.

Shift of the Clutch from Disconnected State to Connected State and Detection of Touch Point Preparation Position by Another Method The function of components defining the clutch 3 in a case where the clutch 3 shifts from the disconnected state to the connected state will now be described while describing the detection of the touch point preparation position in this case.

Figure 11A:
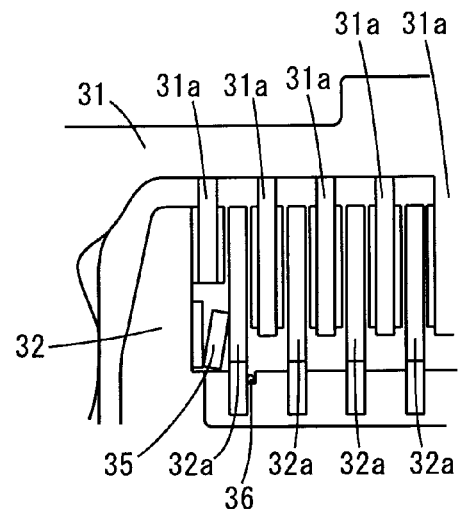
FIGS. 11A-11C are schematic views showing the function of components defining a clutch in a case where the clutch shifts from the connected state to the disconnected state.
Figure 11B:
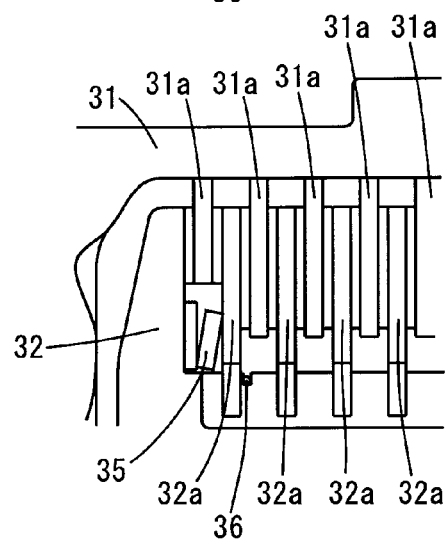
Figure 11C:
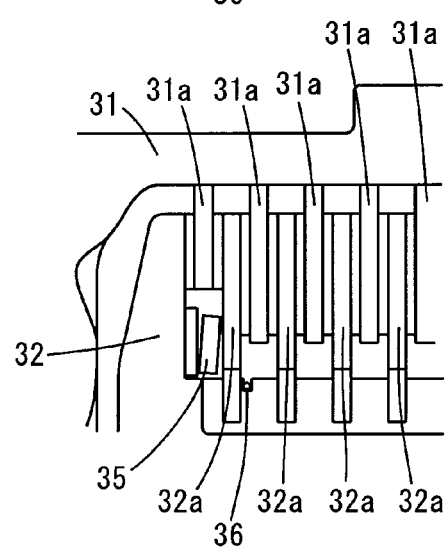
Figure 12:
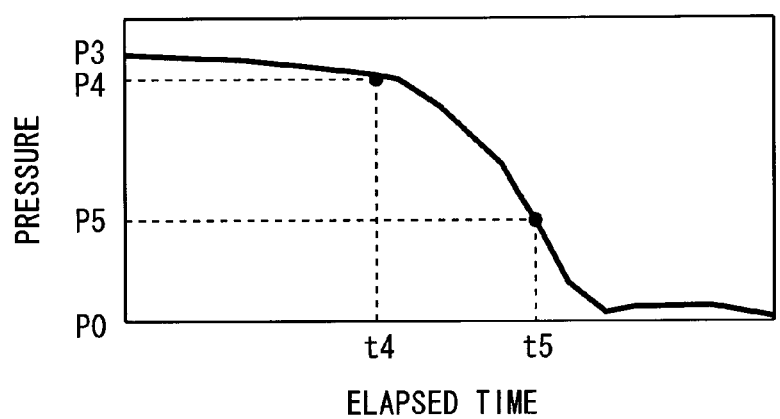
FIG. 12 is an explanatory view showing a method of detecting a touch point preparation position in a case where the clutch shifts from the disconnected state to the connected state.

FIGS. 11A to 11C are schematic views showing the function of the components defining the clutch 3 in a case where the clutch 3 shifts from the disconnected state to the connected state. FIG. 12 is an explanatory view showing a method of detecting the touch point preparation position in a case where the clutch 3 shifts from the disconnected state to the connected state. Note that the following case is reversed from the above-mentioned case where the clutch shifts from the connected state to the disconnected state, and therefore the description thereof is simplified.

FIG. 11A illustrates a case where the clutch 3 is in the disconnected state, FIG. 11B illustrates a case where the clutch 3 is in the half clutched state, and FIG. 11C illustrates a case where the clutch 3 is in the connected state. In FIG. 12, the horizontal axis indicates an elapsed time period, the vertical axis indicates pressure within the cylinder 4b in the clutch master cylinder 4, and the change in the pressure within the cylinder 4b is indicated by a solid line.

As shown in FIG. 12, when the actuator 100 moves the master piston 4c in the cylinder 4b in the clutch connection direction at a substantially constant speed with the clutch 3 disconnected when the pressure within the cylinder 4b is P3 (a state shown in FIG. 11A), the pressure within the cylinder 4b gradually decreases to P4 in an elapsed time period t4.

In this case, the pressure plate 33 moves in the direction in which the return spring 34 is extended. As a result, a clearance between the adjacent friction plate 31a and clutch plate 32a gradually decreases. In time, the friction plates 31a and the clutch plates 32a are respectively brought into contact with each other to such a degree that no power is transmitted to the clutch 3.

Here, the pressure P4 within the cylinder 4b in the elapsed time period t4 during which the friction plates 31a and the clutch plates 32a are respectively brought into contact with each other to such a degree that no power is transmitted to the clutch 3 corresponds to the touch point preparation position. Note that the cushion spring 35 attempts to start to deflect from a state where it is the set length (a state shown in FIG. 11B).

Then, when the actuator 100 further moves the master piston 4c in the cylinder 4b in the clutch connection direction at a substantially constant speed, the pressure within the cylinder 4b rapidly decreases to P5 in an elapsed time period t5.

In this case, the cushion spring 35 starts to deflect, so that the cushion spring 35 generates pressure in the direction opposite to the direction of pressure generated by the return spring 34. This causes the friction plates 31a and the clutch plates 32a to respectively come into contact with each other (a state shown in FIG. 11C), so that power from the engine 1 is transmitted to the clutch 3.

A method of detecting the touch point preparation position in a case where the clutch 3 shifts from the disconnected state to the connected state will now be described. Note that the following case is reversed from the above-mentioned case where the clutch 3 shifts from the connected state to the disconnected state, and therefore the description thereof is simplified.

Here, in order to detect the moment the spring length of the cushion spring 35 starts to deflect from the set length, that is, a stage immediately before the shift of the clutch 3 to the connected state, a rate of the pressure increase within the cylinder 4b is calculated. The pressure P4 within the cylinder 4b is detected on the basis of the calculated rate of the pressure increase.

Note that, in this example, the position of the rod 101 in a case where the pressure within the cylinder 4b is P4 is also stored in the storage 60 as a touch point preparation position, to carry out start control of the vehicle on the basis of the touch point preparation position.

Effects of the Preferred Embodiments

As described in the foregoing, a touch point that differs from motorcycle to motorcycle due to wear (a change in the coefficient of friction) of each of the friction plates 31a and the clutch plates 32a defining the clutch 3, the viscosity of oil, or the like is not used.

That is, it is possible to carry out start control of the motorcycle smoothly and quickly by detecting the touch point preparation position immediately before the touch point at which the power from the engine 1 starts to be transmitted to the clutch 3 and bringing the clutch 3 into the connected state or the disconnected state using the detected touch point preparation position. This prevents the rider from being strongly jolted, and can prevent the motorcycle from running out or prevent the engine from stalling.

In a preferred embodiment, it is possible to inhibit the engine 1 from turning freely and quickly transmit the power to the clutch 3 by moving the rod 101 in the actuator 100 to the touch point preparation position at a high first speed.

Motorcycle Including Clutch Connection Control Apparatus

Figure 13:
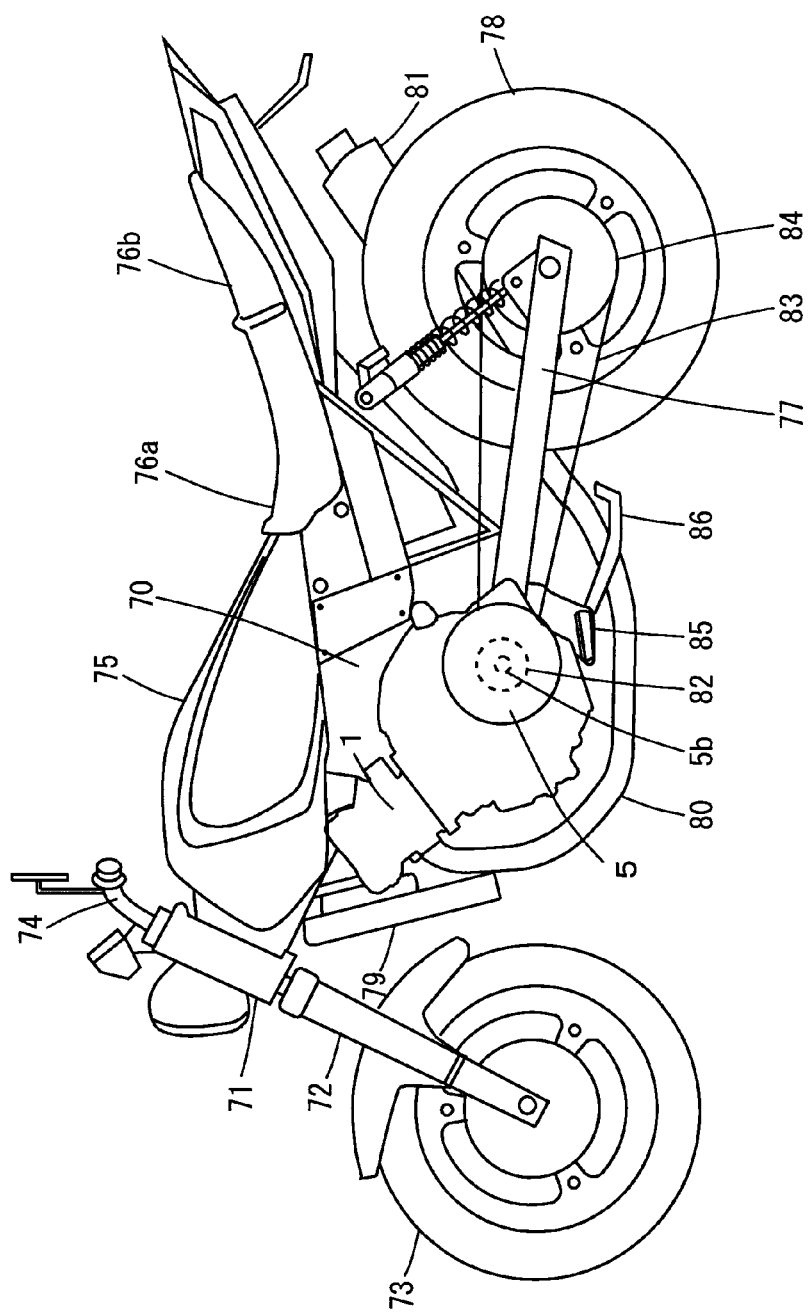
FIG. 13 is a schematic view of the motorcycle including the clutch connection control apparatus according to a preferred embodiment of the present invention.

FIG. 13 is a schematic view of a motorcycle including a clutch connection control apparatus according to a preferred embodiment.

As shown in FIG. 13, a head pipe 71 is provided at a front end of a main body 70. A front fork 72 is provided so as to be swingable from side to side in the head pipe 71. A front wheel 73 is rotatably supported on a lower end of the front fork 72. A handle 74 is attached to an upper end of the head pipe 71.

The handle 74 is provided with the clutch master cylinder 4, the AMT/MT switch 13, the shift switch 14, the clutch switch 15, the cell switch 17, and the ignition cutoff switch 18, which are shown in FIG. 1.

A fuel tank 75, a main seat 76a, and a tandem seat 76b are provided rearward from the handle 74 above the main body 70.

A rear arm 77 extending rearward is attached to a lower end of the main body 70. A rear wheel 78 is rotatably supported on a rear end of the rear arm 77.

Furthermore, a transmission 5 and an engine 1 are provided at the lower end of the main body 70. A radiator 79 is attached to the front of the engine 1. An exhaust pipe 80 is connected to an exhaust port of the engine 1, and a muffler 81 is attached to a rear end of the exhaust pipe 80. The actuator 100 and the hydraulic shift actuator 9 shown in FIG. 1 are provided in the main body 70.

A sprocket 82 is attached to a drive shaft 5a in the transmission 5. The sprocket 82 is connected to a rear wheel sprocket 84 in the rear wheel 78 through a chain 83.

A shift pedal 85 is provided beside a lower end of the transmission 5. A side stand 86 is provided at the lower end of the main body 70.

In the motorcycle shown in FIG. 13, the clutch connection control apparatus according to the various preferred embodiments may be used. Therefore, the clutch 3 can be brought into the connected state and the disconnected state smoothly and quickly.

Another Preferred Embodiment

Although in the various preferred embodiments above, description was made of a case where the detected touch point preparation position is applied to a start control of the motorcycle, the present invention is not limited to this. For example, it can be similarly applied to a stop control of the motorcycle.

Although in the preferred embodiments above, description was made of a case where the clutch 3 is a wet multi-plate friction clutch, the present invention is not limited to this. For example, a dry clutch, a single plate clutch, or a combination can be also used as the clutch 3 according to another preferred embodiment.

Furthermore, although in the preferred embodiments above, description was made of a case where the clutch connection control apparatus is applied to a motorcycle, the clutch connection control apparatus is similarly applicable to other vehicles, such as motorized three-wheelers or motorized four-wheelers.

Correspondences between Constituent Elements in the Claims and Parts in the Preferred Embodiments In the following paragraphs, non-limiting examples of correspondences between various elements recited in the claims below and those described above with respect to various preferred embodiments of the present invention are explained.

In the preferred embodiments described above, the crank 2 is an example of a first shaft, the main shaft 5a is an example of a second shaft, the clutch connection direction is an example of first direction, the clutch disconnection direction is an example of a second direction, the push rod 40 and the pressure plate 33 are examples of a driving member, the connected state of the clutch 3 is an example of a first state, the disconnected state of the clutch 3 is an example of a second state, the touch point preparation position is an example of a pre-operation point, the actuator 100, the servo unit 39, the piping 39a, and the clutch master cylinder 4 are examples of a driving device, the pressure sensor 4a and the position sensor 100a are examples of a detector, the controller 50 is an example of a calculator, a determination unit, and a control device, the storage 60 is an example of a storage device, the crank rotation angle sensor 12 is an example of a first rotational speed detector, and the main shaft rotational speed sensor 20 is an example of a second rotational speed detector.

In the preferred embodiments described above, the rate of the pressure increase is an example of a rate of change of a load, the pressure within the cylinder 4b is an example of the value of a load, the position of the master piston 4c, the position of the rod 101, the position of the push rod 40, and the rotation angle of the motor 102 in the actuator 100 are examples of the value of information having a predetermined relationship with the position of a driving member.

Furthermore, in the preferred embodiments described above, the clutch master cylinder 4, the piping 39a, and the servo unit 39 are examples of a hydraulic system, the pressure sensor 4a is an example of a pressure detector, the clutch plate 32a and the friction plate 31a are respectively examples of first and second friction plates, the return spring 34 and the cushion spring 35 are respectively examples of first and second elastic members, the master piston 4c is an example of a moving member, the rear wheel 78 is an example of a driving wheel, the crank 2 and the clutch 3 are examples of a first transmission mechanism, and the transmission 5, the drive shaft 5b, the sprocket 82, the chain 83, and the rear sprocket 84 are examples of a second transmission mechanism.

As the elements recited in the claims, various other elements having the structure or function recited in the claims may be employed.

The present invention is applicable to vehicles such as a motorcycle.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A clutch connection control apparatus arranged to connect and disconnect a torque between a first shaft and a second shaft, the clutch connection control apparatus comprising:

a clutch including a driving member movable in a first direction and a second direction opposite to the first direction, the clutch biased in the first direction and arranged to shift to a first state where the torque is transmitted between the first shaft and the second shaft by the movement in the first direction of the driving member, and to shift to a second state where the torque is not transmitted between the first shaft and the second shaft by the movement in the second direction of the driving member;

a driving device arranged to move the driving member in the clutch in the first direction and the second direction;

a detector arranged to detect a load applied to the driving device by the driving member in a process of shifting from the second state to the first state or a process of shifting from the first state to the second state in a predetermined preparation operation;

a calculator arranged to calculate a rate of change in the load detected by the detector;

a determination unit arranged to determine the value of the load applied to the driving device by the driving member at a time point preceding a time point where the clutch shifts to the first state or the second state, or to determine a position of an element having a predetermined relationship with a position of the driving member at the time point preceding the time point where the clutch shifts to the first state or the second state, as a pre-operation point based on the rate of change in the load calculated by the calculator;

a storage device arranged to store the pre-operation point determined by the determination unit; and a control device arranged to control the driving device such that the movement speed of the driving member is changed when the value of the load applied to the driving device in the process of shifting from the second state to the first state, or when the position of the element having the predetermined relationship with the position of the driving member, is equal to the pre-operation point stored in the storage device in a normal clutch operation.

2. The clutch connection control apparatus according to claim 1, wherein the determination unit is arranged to determine, when the rate of change in the load detected by the detector is reduced to a first value, a second value, and a third value, in this order, in the process of shifting from the first state to the second state, the value of the load applied to the driving device by the driving member at a change point between the second value and the third value or the position of the element having the predetermined relationship with the position of the driving member at the time point preceding the time point where the clutch shifts to the first state or the second state as the pre-operation point; and the control device is arranged to control the driving device such that the movement speed of the driving member is reduced when the value of the load applied to the driving device by the driving member in the process of shifting from the second state to the first state or the position of the element having the predetermined relationship with the position of the driving member is equal to the pre-operation point stored in the storage device in the normal clutch operation.

3. The clutch connection control apparatus according to claim 1, further comprising:

a first rotational speed detector arranged to detect a rotational speed of the first shaft; and a second rotational speed detector arranged to detect a rotational speed of the second shaft; wherein the first shaft transmits the torque to the second shaft at a predetermined ratio of the rotational speeds; and the control device controls, in the normal clutch operation, the driving device such that the driving member moves at a first speed until the value of the load applied to the driving device in the process of shifting from the second state to the first state or the position of the element having the predetermined relationship with the position of the driving member reaches the pre-operation point, moves at a second speed lower than the first speed from the pre-operation point until the second rotational speed detector detects the rotation of the second shaft, then moves at a third speed lower than the second speed, and moves at a fourth speed higher than the third speed when the product of the rotational speed of the first shaft, which is detected by the first rotational speed detector, and the ratio substantially coincides with the rotational speed of the second shaft, which is detected by the second rotational speed detector.

4. The clutch connection control apparatus according to claim 1, wherein the driving device includes an actuator arranged to generate a driving force, and a hydraulic system that converts the driving force generated by the actuator into hydraulic pressure; and the detector includes a pressure detector that detects the hydraulic pressure obtained by the hydraulic system as the load.

5. The clutch connection control apparatus according to claim 1, wherein the clutch further includes:

first and second friction plates arranged to move alternately in the first direction and the second direction;

a first elastic member arranged to bias the first friction plate in the direction in which the first friction plate presses the second friction plate; and a second elastic member arranged to bias the second friction plate in the direction in which the second friction plate presses the first friction plate; wherein an elastic coefficient of the first elastic member is less than an elastic coefficient of the second elastic member; and the first elastic member biases the driving member in the first direction.

6. The clutch connection control apparatus according to claim 4, wherein the hydraulic system includes:

a cylinder; and a moving member provided in the cylinder so as to be movable in synchronization with the movement of the driving member; wherein the determination unit determines the position of the moving member as the position of the element having the predetermined relationship with the driving member.

7. The clutch connection control apparatus according to claim 4, wherein the actuator includes a motor, and the determination unit determines the rotation angle of the motor as the position of the element having the predetermined relationship with the driving member.

8. A vehicle comprising:

an engine arranged to generate power;

a clutch connection control apparatus;

a driving wheel;

a first transmission mechanism arranged to transmit as a torque the power generated by the engine to a first shaft in the clutch connection control apparatus; and a second transmission mechanism arranged to transmit the torque in a second shaft in the clutch connection control apparatus to the driving wheel; wherein the clutch connection control apparatus includes:

a clutch including a driving member movable in a first direction and a second direction opposite to the first direction, the clutch biased in the first direction and arranged to shift to a first state where the torque is transmitted between the first shaft and the second shaft by the movement in the first direction of the driving member, and to shift to a second state where the torque is not transmitted between the first shaft and the second shaft by the movement in the second direction of the driving member;

a driving device arranged to move the driving member in the clutch in the first direction and the second direction;

a detector arranged to detect a load applied to the driving device by the driving member in a process of shifting from the second state to the first state or a process of shifting from the first state to the second state in a predetermined preparation operation;

a calculator arranged to calculate a rate of change in the load detected by the detector;

a determination unit arranged to determine the value of a load applied to the driving device by the driving member at a time point preceding a time point where the clutch shifts to the first state or the second state, or to determine a position of an element having a predetermined relationship with a position of the driving member at the time point preceding the time point where the clutch shifts to the first state or the second state, as a pre-operation point on the basis of the rate of change in the load calculated by the calculator;

a storage device arranged to store the pre-operation point determined by the determination unit; and a control device arranged to control the driving device such that the movement speed of the driving member is changed when the value of the load applied to the driving device by the driving member in the process of shifting from the second state to the first state or the position of the element having the predetermined relationship with the position of the driving member is equal to the pre-operation point stored in the storage device in a normal clutch operation.

\* \* \* \* \*